R. M. ROBERTS.
TRANSMISSION GEARING AND AXLE.
APPLICATION FILED NOV. 11, 1911.
1,096,196.
Patented May 12, 1914.
2 SHEETS—SHEET 1.
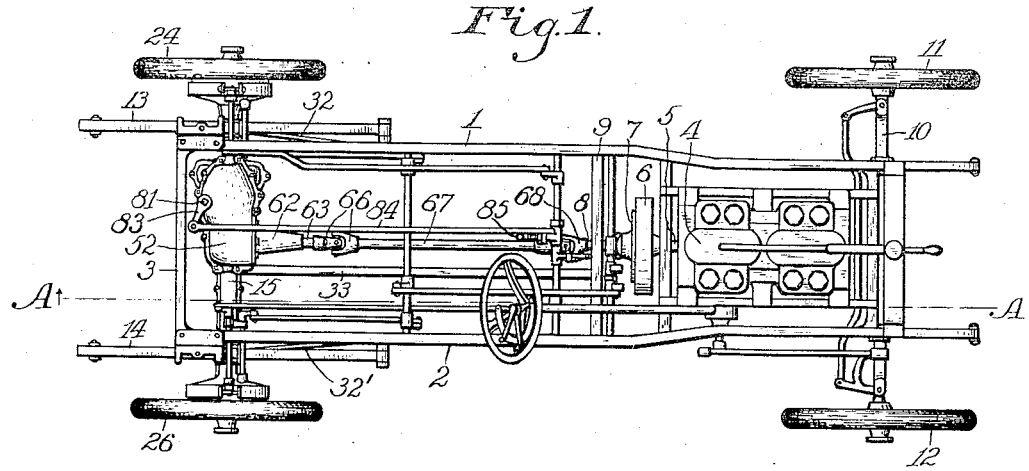
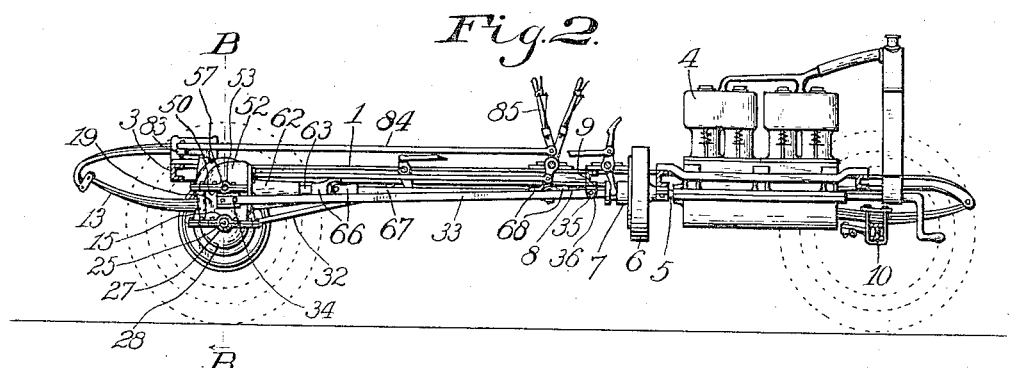
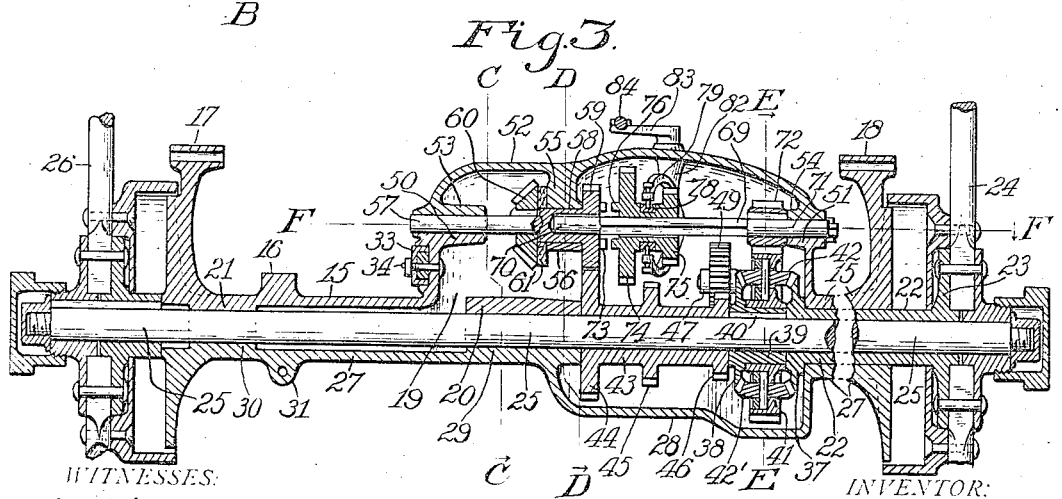
WITNESSES:
J. H. Gardner
M. L. Wilhelm
INVENTOR:
Robert M. Roberts,
BY E. T. Silvius,
ATTORNEY.

R. M. ROBERTS.
TRANSMISSION GEARING AND AXLE.
APPLICATION FILED NOV. 11, 1911.
1,096,196.
Patented May 12, 1914.
2 SHEETS—SHEET 2.
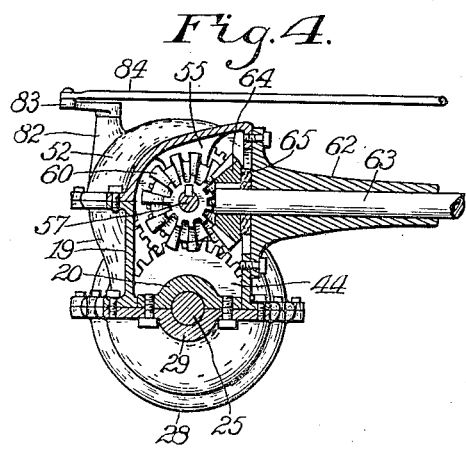
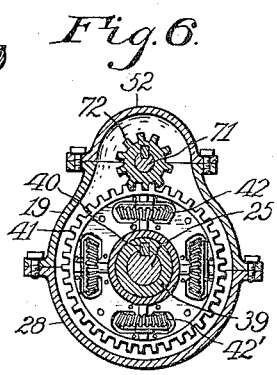
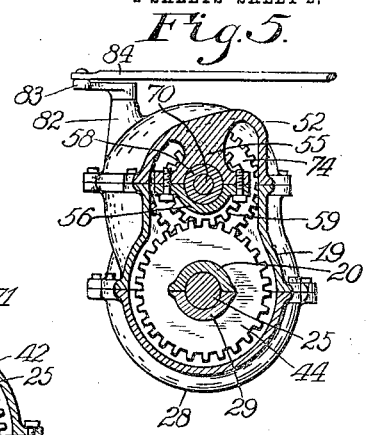
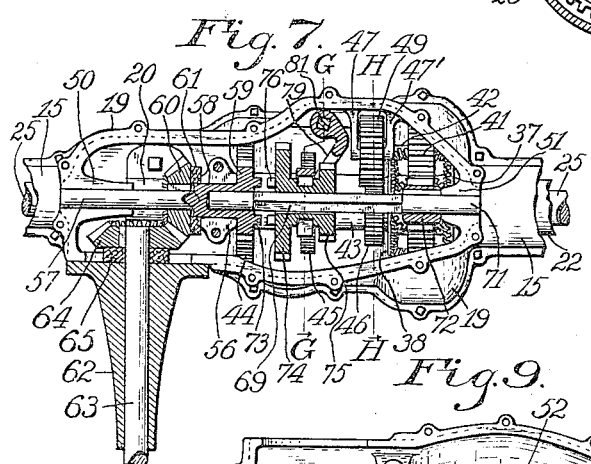
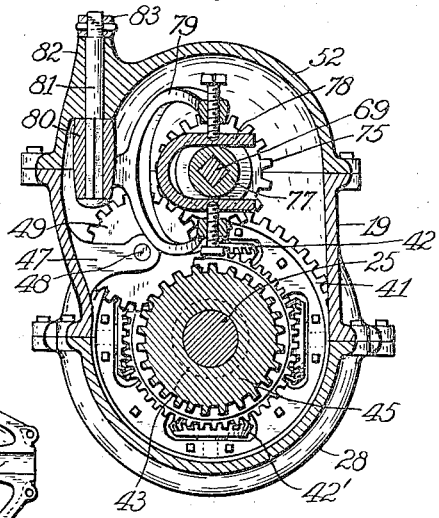
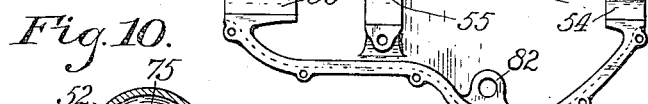
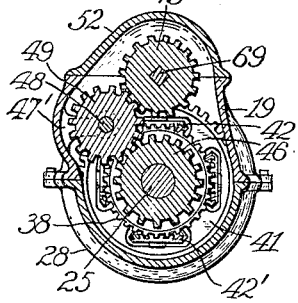
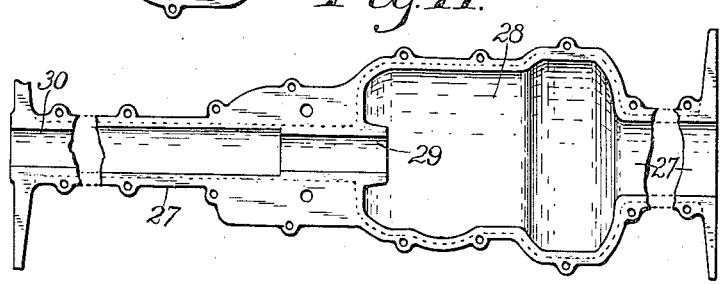
WITNESSES:
J. H. Gardner
M. L. Wilhelm
INVENTOR:
Robert M. Roberts,
BY
E. T. Silvius,
ATTORNEY.

UNITED STATES PATENT OFFICE.

ROBERT M. ROBERTS, OF ANDERSON, INDIANA, ASSIGNOR, BY MESNE ASSIGNMENTS, OF ONE-HALF TO GEORGE A. BRAKEMAN, OF ANDERSON, INDIANA.

TRANSMISSION-GEARING AND AXLE.

1,096,196.  Specification of Letters Patent.  Patented May 12, 1914.

Application filed November 11, 1911. Serial No. 659,848.

*To all whom it may concern:*

Be it known that I, ROBERT M. ROBERTS, a citizen of the United States, residing at Anderson, in the county of Madison and State of Indiana, have invented a new and useful Transmission-Gearing and Axle, of which the following is a specification, reference being had to the accompanying drawings and to the letters and figures of reference marked thereon.

This invention relates to the driving axles and the gearing for connecting the driving axles with the engines of automobiles, the invention having reference more particularly to a unitary axle and gearing housing and to also improved transmission gearing mounted in the housing in connection with the axle portion of the structure.

The object of the invention is to provide a substantial and reliable driving axle and transmission gearing embracing speed changing gearing and also differential gearing in compact arrangement, and so arranged as to be thoroughly protected from dust and be readily accessible for readjustment or repairs; a further object of the invention being to provide improved construction and arrangement in transmission gearing for automobiles that will permit of the use of a substantially straight propeller shaft for connecting the engine with the speed changing driving gearing when the engine is mounted with its shaft horizontally on a higher plane than that of the axles of the vehicle.

A still further object is to provide improved transmission gearing and axles or shafts for various purposes that may be constructed in a substantial and inexpensive manner and be durable and economical in use.

With the above mentioned and minor objects in view, the invention consists in an improved combined axle and gearing housing, in improved transmission gearing mounted in the housing, and in the novel parts and novel combinations and arrangements of parts as hereinafter particularly described and pointed out in the accompanying claims.

Referring to the drawings, Figure 1 is a top plan of an automobile frame and running gear and an explosion engine mounted on the forward portion of the frame as is customary, the invention being illustrated in connection therewith; Fig. 2, a sectional elevation approximately on the plane of the line A A in Fig. 1; Fig. 3, a fragmentary vertical section on the plane of the line B B in Fig. 2; Fig. 4, a fragmentary sectional elevation on the plane of the line C C in Fig. 3; Fig. 5, a sectional elevation on the planes of the line D D in Fig. 3; Fig. 6, a sectional elevation on the plane of the line E E in Fig. 3; Fig. 7, a fragmentary section on the plane of the line F F in Fig. 3; Fig. 8, a fragmentary sectional elevation on the planes of the line G G in Fig. 7; Fig. 9, an inverted plan of the top portion of the gearing housing; Fig. 10, a fragmentary sectional elevation on the plane of the line H H in Fig. 7; and Fig. 11, a top plan of the lower or oil-box portion of the housing.

Similar reference characters throughout the drawings indicate corresponding elements or features of construction herein referred to and described.

In the drawings a common type of automobile frame is illustrated comprising side bars 1 and 2 and a tail bar 3, an explosion engine 4 being mounted on the forward portion of the side bars, the engine having a rearwardly extending driving shaft 5 provided with a clutch member 6, a movable clutch member 7 being adapted to be connected with the clutch member 6 and is suitably mounted on a short stub shaft 8 suitably supported under a cross bar 9 of the frame. The forward portion of the frame is supported as usual upon a suitable front axle 10 provided with wheels 11 and 12. The rear portion of the frame is provided with suitable supporting springs 13 and 14.

The improved axle comprises a main portion or casing part 15 provided with spring blocks 16 for directly supporting the springs, and having also brake supports 17 and 18 thereon, the main portion 15 having an integral main housing part 19 thereon in which is arranged a central shaft bearing 20, one end portion of the main part 15 having a shaft bearing 21 therein, the opposite end portion of the main part 15 beyond the housing part being adapted to constitute a shaft bearing and it has a hollow shaft 22 rotatably mounted therein, a suitable wheel hub 23 being integrally or otherwise fixed to the hollow shaft, said hub being a part of one of the driving wheels 24. An axle shaft 25 is somewhat longer than the main axle part 15 and is rotatable in the hollow shaft 22 and extends rotatably through the hub 23, the shaft supporting the bearings 20 and 21 and its opposite end portion is secured fixedly to a companion driving wheel 26. The main axle part 15 extends over the upper portion of the shaft 25 at opposite ends of the housing part, and an under portion or casing part 27 having an integral oil-box 28 incases the under side of the shaft and is secured to the main portion and the housing, the said under portion being provided with a journal bearing cap 29 which is secured to the bearing 20 and supported thereby, the under part 27 having also a cap 30 that is secured to and supported by the bearing 21, the portion of the part 27 beyond the oil-box constituting a cap embracing the under portion of the hollow shaft 22. The under part 27 is provided with ears 31 to which radius rods 32, 32', are connected, the rods extending upward obliquely and are suitably connected to the frame of the vehicle. A torsion bar 33 is fixedly secured to the housing part 19 by means of bolts 34 and it extends forward nearly to the clutch member 7 and is connected by means of a pivot 35 to a bracket 36 which is supported by the cross bar 9 of the frame, the bar 33 being nearly parallel with the plane of the frame and maintains the housing firmly above the axle, being assisted by the radius rods. The inner end of the hollow shaft 22 has a beveled gear wheel 37 thereon at the inner side of the adjacent portion of the housing part and oil-box. A similar but oppositely facing beveled gear wheel 38 has a long hub 39 which is secured by a key 40 or otherwise to the axle shaft 25 adjacent to the wheel 37, the hub 39 rotatably supporting a spur toothed master or main gear wheel 41 which carries a suitable number of rotatable beveled pinions 42, 42', that are in mesh with both the wheels 37 and 38 to constitute differential or equalizing gearing. A long hub or sleeve 43 is rotatably mounted on the shaft 25 and extends from the wheel 38 to the shaft bearing 20 and it has a spur toothed driven wheel 44 on the end thereof that is adjacent to the bearing, the hub 43 having a relatively smaller driving gear wheel 45 and also a still smaller driving gear wheel 46 thereon for effecting changes of speed and direction of motion. Two brackets 47 and 47' are supported on the inner side of the housing part 19 and support a shaft 48 on which is a rotatable reversing gear wheel 49 that is constantly in mesh with the wheel 46 for effecting back motion.

The housing part 19 is provided with shaft bearings 50 and 51 at opposite end portions thereof respectively, and a housing cap part 52 is secured removably to the main housing part 19 and has journal box caps 53 and 54 secured to the bearings 50 and 51 respectively, the upper portion of the cap part supporting a journal box cap 55 to which a shaft bearing 56 is removably secured. A transmission shaft 57 is journaled on the bearing 50 and preferably has a socketed end portion 58 that is journaled on the bearing 56 and has a power-actuated gear wheel 59 thereon that is constantly in mesh with the wheel 44, the shaft 57 having a beveled gear wheel 60 secured thereto adjacent the socketed end portion, there being a suitable anti-frictional collar 61 inserted between the back of the gear wheel and the bearing 56 and its cap 55. A suitable journal box 62 is secured to the forward sides of the main part 19 and the cap part 52 and is thereby supported in approximately horizontal position or nearly in alinement with the stub shaft 8, and it rotatably supports a stub shaft 63 having a beveled gear wheel 64 secured to its inner end within the housing and in mesh with the wheel 60, there being a suitable anti-frictional collar 65 inserted between the back of the wheel 64 and the inner end of the journal box 62. A universal coupling 66 is connected to the outer or forward end of the stub shaft 63 and has one end of a propeller shaft 67 connected thereto, the opposite end of the shaft 67 having a universal coupling 68 connected thereto that is connected also to the stub shaft 8. The shaft 67 is approximately in alinement with the engine shaft 5 and is of considerable length, the universal couplings being employed merely for preventing lateral strains on the propeller shaft that might result by reason of the springs between the axle and the vehicle frame, the couplings, however, being relieved of the severe strains and wear incidental to the use of oblique angled shafts.

Another transmission shaft 69 preferably has a squared middle portion and it has a cylindrical end portion 70 that is journaled in the socketed end portion 58, and it has also a cylindrical end portion 71 journaled on the shaft bearing 51 that is provided with the cap 54. A pinion 72 is secured to the shaft 69 or its end portion 61 and is constantly in mesh with the wheel 41. The wheel 59 has projecting clutch teeth 73 that extend toward the pinion 72. Two gear wheels 74 and 75 are slidingly mounted on the shaft 69 but so that they must rotate therewith, the wheel 74 having clutch teeth 76 on one side thereof that may be moved into engagement with the teeth 73, the wheels 74 and 75 preferably being cast integrally on a common hub 77 so that both wheels are conveniently moved simultaneously as a unitary gearing element along the shaft, and a suitable yoke 78 spans the hub between the two wheels for shifting them, a shifter 79 being suitably connected with the yoke and having a hub 80 which is secured to a rock shaft 81 mounted in a shaft bearing 82 with which the cap part 52 is provided. The shaft 81 extends vertically through its bearing and has an arm 83 secured to its upper end, a connecting rod 84 being pivotally connected to the arm. The rod 84 is of considerable length and extends forward above the plane of the frame and is connected to an operating lever 85 which is mounted in a convenient position on the frame so as to be near the position of the operator of the automobile.

In practical use the clutch member 7, as will be understood, is operated by the usual or any suitable means and the lever 85 is moved forward or rearward as required for shifting the wheels 74 and 75 in order to change the speed, reverse the motion or stop the motion of the driving axle. It will readily be understood that when the shaft 67 rotates, the wheel 59 is in motion and causes the hub 43 to rotate, and in order to operate the vehicle at slow speed the wheel 74 is clutched to the wheel 59, thus rotating the pinion 72 which transmits the motion to the master wheel 41. When the wheel 74 is moved into connection with the wheel 45 the speed obviously is increased. When the wheel 74 is disconnected from the wheel 45, and the wheel 75 moved into connection with the wheel 49 it will be clear that the shaft 69 is rotated in reverse direction so as to reverse the motion of the automobile.

Having thus described the invention, what is claimed as new is—

1. Gearing including an axle rotatably supported, a main gear wheel supported to rotate about the axis of the axle, a transmission shaft rotatably supported, a pinion fixed on the shaft in mesh with the main gear wheel, a rotatably supported reversing gear wheel, a hub rotatably mounted on the axle and having a driven and two driving gear wheels fixed thereon, one of the driving gear wheels being in mesh with the reversing gear wheel, a power-actuated gear wheel rotatable on the transmission shaft in mesh with the driven gear wheel of the hub, and a transmission gearing element for rotating the transmission shaft slidable thereon into connection with either the reversing gear wheel or the remaining one of the driving gear wheels of the hub to be driven thereby.

2. A transmission gearing and axle including an axle shaft, a hollow shaft rotatable on the axle shaft, a main casing part journaled on the axle shaft and also on the hollow shaft and having a main housing part on the uppermost side thereof, an under casing part secured to the main casing part and having an oil box thereon that is secured to the main housing part, differential gearing mounted jointly on the axle shaft and the hollow shaft, speed-changing gearing rotatably mounted on the axle shaft, a transmission shaft mounted on the top of the main housing part and operatively connected with the speed-changing gearing, means mounted on the transmission shaft for operatively connecting the speed-changing gearing with the differential gearing, and a cover part detachably secured to the top of the main housing part.

3. Transmission gearing including an axle shaft, a hollow shaft rotatable on the axle shaft and having a gear wheel fixed thereon, a master-wheel rotatable about the axis of the axle shaft, a pinion rotatably mounted on the master-wheel and meshing with the gear wheel, a gear wheel fixedly secured to the axle shaft and meshing with the pinion, a casing member journaled on the axle shaft and also on the hollow shaft and having a housing on the upper portion thereof, a transmission shaft rotatable in the housing above the axle shaft and operatively connected with the master-wheel, a bevel gear wheel fixedly secured to the transmission shaft, a stub shaft rotatably mounted on the housing and extending therefrom at right angles to the plane of the axle shaft and transmission shaft, and a bevel gear wheel fixedly secured to the stub shaft and meshing with the first-described bevel gear wheel.

4. The combination of an axle shaft, a hollow shaft rotatable on the axle shaft, a main casing part journaled on the axle shaft and also on the hollow shaft and supported thereby and having a main housing part thereon supported thereby and provided with shaft-bearings, an under casing part detachably secured to the main casing part and having an oil box secured to the main housing part, said under part having a journal box cap thereon, a shaft bearing supported on the axle shaft in the main housing part and secured to said cap, a cover part detachably secured to the main housing part and having journal box caps thereon secured to the shaft-bearings of said main housing part, and a transmission shaft rotatably mounted on the shaft bearings of said main housing part, with speed-changing gearing and differential gearing inclosed in said housing and oil box and cover parts coöperating with said transmission shaft and said axle shaft and also with said hollow shaft.

5. The combination with an axle shaft, a hollow shaft rotatable on the axle shaft, a main casing part journaled on the axle shaft and also on the hollow shaft and having a main housing part thereon provided with shaft-bearings, and differential gearing in the main housing part having equalizing connection with the hollow shaft and the axle shaft, of a cover part removably secured to the main housing part and having journal box caps secured to the shaft-bearings, said cover part having a depending journal box on the inner side thereof, a transmission shaft journaled on one of said shaft-bearings and having a socketed end portion journaled in said depending journal box, said end portion having a gear wheel and also clutch teeth thereon, a second transmission shaft rotatable in said socketed end portion and also on the remaining one of said shaft-bearings, a pinion secured to said second transmission shaft in connection with said differential gearing, a hub rotatable on said axle shaft and having a plurality of gear wheels thereon of which one is in mesh with the wheel on said socketed end portion, and a gear wheel rotatable with and also slidable on said second transmission shaft into or out of mesh with the remaining one of the gear wheels on said hub, said slidable wheel having clutch teeth thereon movable into or out of contact with said first-described clutch teeth.

6. The combination, with an axle shaft, and a hollow shaft rotatable on the axle shaft, of a main casing part journaled on the axle shaft and having a main housing part thereon provided on its top with shaft-bearings, the housing part having a bracket on the inner side thereof, differential gearing having equalizing connection with the axle shaft and the hollow shaft, a hub rotatable on the axle shaft and having a plurality of gear wheels thereon, a back gear wheel rotatably mounted on said bracket and meshing with one of said plurality of gear wheels, a cover part secured to said main housing part and having a rock-shaft mounted therein, a gear wheel rotatably supported in mesh with one of the said plurality of gear wheels, a transmission shaft rotatably mounted on said shaft-bearings, a pinion fixed on said transmission shaft in connection with said differential gearing, two shifting gear wheels having a hub common to both and rotatable with and slidable on said transmission shaft to move one of the wheels into or out of contact with the remaining one of said plurality of gear wheels or to move the other of the two wheels into or out of contact with said back gear wheel, and a shifter fixedly mounted on said rock-shaft and carrying a yoke between said two shifting gear wheels for shifting them.

7. The combination with an axle shaft, a hollow shaft rotatable on the axle shaft, a housing journaled on the axle shaft and the hollow shaft, and differential gearing in the housing having equalizing connection with the hollow shaft and the axle shaft, of a transmission shaft rotatably mounted in the housing and having a pinion fixed thereon and in connection with the differential gearing, a hub rotatable on the axle shaft and having a plurality of gear wheels fixed thereon, a reversing gear wheel rotatably supported in the housing in mesh with one of the plurality of gear wheels, a power-actuated gear wheel rotatable on the transmission shaft in mesh with another one of the plurality of gear wheels and having a clutch device thereon, a gearing element rotatable with and also slidable on the transmission shaft into or out of mesh with either the reversing gear wheel or the remaining one of the plurality of gear wheels and having a clutch member thereon movable into or out of contact with said clutch device.

8. The combination with an axle shaft, a housing journaled on the axle shaft, a main gear wheel rotatably mounted in the housing and adapted for rotating about the axle shaft, and means for connecting the wheel with the shaft, of a transmission shaft rotatably mounted in the housing, a pinion fixed on the transmission shaft in mesh with the main gear wheel, a hub rotatably mounted on the axle shaft and having a plurality of gear wheels fixed thereon, a power-actuated gear wheel rotatably mounted in the housing in mesh with one of the plurality of gear wheels and having a clutch device thereon, and a gear wheel rotatable with and also slidable on the transmission shaft into or out of mesh with the remaining one of the plurality of gear wheels and having a clutch member thereon movable into or out of contact with the clutch device.

9. In gearing, the combination of a rotatably supported main shaft, a hub rotatably mounted on the shaft and having a plurality of gear wheels thereon, a reversing gear wheel rotatably supported in mesh with one of the plurality of gear wheels, and a power-actuated gear wheel rotatably supported in mesh with another one of the plurality of gear wheels and having a clutch device thereon, with a rotatably supported transmission shaft, a rotatable main gear wheel adapted for rotating the main shaft, gearing for connecting the main gear wheel with the main shaft, a pinion fixed on the transmission shaft in mesh with the main gear wheel, and a gear wheel rotatable with and also slidable on the transmission shaft into or out of mesh with the remaining one of the plurality of gear wheels and having a clutch member thereon movable into or out of contact with said clutch device.

In testimony whereof, I affix my signature in presence of two witnesses.

ROBERT M. ROBERTS.

Witnesses:
WM. ROWLAND,
ALMA BASSETT.